(12) United States Patent
Chen et al.

(10) Patent No.: US 9,538,597 B2
(45) Date of Patent: Jan. 3, 2017

(54) MULTICHANNEL POWER SUPPLY

(75) Inventors: Keng Chen, North Andover, MA (US); Christian Breuer, Newburyport, MA (US); Canyon Bliss, Revere, MA (US)

(73) Assignee: OSRAM SYLVANIA Inc., Wilmington, MA (US)

( * ) Notice: Subject to any disclaimer, the term of this patent is extended or adjusted under 35 U.S.C. 154(b) by 1012 days.

(21) Appl. No.: 13/594,739

(22) Filed: Aug. 24, 2012
(Under 37 CFR 1.47)

(65) Prior Publication Data
US 2013/0049462 A1    Feb. 28, 2013

Related U.S. Application Data

(60) Provisional application No. 61/527,535, filed on Aug. 25, 2011.

(51) Int. Cl.
*H02J 4/00* (2006.01)
*H05B 33/08* (2006.01)

(52) U.S. Cl.
CPC ........ *H05B 33/0842* (2013.01); *Y10T 307/305* (2015.04)

(58) Field of Classification Search
CPC ................ H05B 33/0842; Y10T 307/305
USPC ............................................. 307/29
See application file for complete search history.

(56) References Cited

U.S. PATENT DOCUMENTS

| 7,244,036 | B2 * | 7/2007 | Murakami et al. ............. 362/20 |
| 2002/0144163 | A1 | 10/2002 | Goodfellow et al. |
| 2003/0030326 | A1 | 2/2003 | Shenai et al. |
| 2005/0083024 | A1 * | 4/2005 | Harris et al. .................. 323/282 |
| 2006/0239046 | A1 | 10/2006 | Zane et al. |
| 2009/0152949 | A1 | 6/2009 | Adragna et al. |
| 2011/0291574 | A1 * | 12/2011 | Ji et al. .......................... 315/187 |
| 2011/0309770 | A1 * | 12/2011 | Prasad .......................... 315/307 |

FOREIGN PATENT DOCUMENTS

DE    20 2009 009856 U1    12/2009

OTHER PUBLICATIONS

Gustav Albertsson, International Search Report and Written Opinion of the International Searching Authority for PCT/US12/52399, Jan. 1, 2013, pp. 1-10, European Patent Office, Rijswijk, The Netherlands.
8-bit AVR Microcontroller with 8K Bytes In-System Programmable Flash, AT90PWM2, AT90PWM3, Aug. 2010, pp. 1-361, Atmel Corporation, San Jose, California, United States of America.

* cited by examiner

*Primary Examiner* — Thienvu Tran
*Assistant Examiner* — Kevin J Comber
(74) *Attorney, Agent, or Firm* — Shaun P. Montana

(57) ABSTRACT

Systems and methods for a multichannel power supply are disclosed. The multichannel power supply includes a front end circuit configured to receive an input voltage and to provide a regulated front end direct current (DC) voltage. A multichannel source circuit is coupled to the front-end circuit. The multichannel source circuit includes a controller, a reference voltage circuit, and a plurality of source circuits. Each source circuit in the plurality of source circuits represents a distinct output channel of the multichannel power supply. The multichannel source circuit is configured to generate a constant current output for each source circuit in the plurality of source circuits. Each load in a plurality of loads is connected to a corresponding source circuit in the plurality of source circuits and is configured to receive the corresponding constant current output via the corresponding source circuit.

16 Claims, 7 Drawing Sheets

MULTICHANNEL POWER SUPPLY

CROSS-REFERENCE TO RELATED APPLICATION

The present application claims priority of U.S. Provisional Patent Application No. 61/527,535, filed Aug. 25, 2011, the entire contents and teachings of which are hereby incorporated by reference.

TECHNICAL FIELD

The present invention relates to power supplies, and more specifically, to configurable multiple channel constant current output power supplies.

BACKGROUND

Multiple output channel (a.k.a. multiple channel or multichannel) power supplies used in the United States are typically subject to the UL1310 Class 2 safety standard. The UL1310 standard limits the voltage, current, and power of each output of a power supply classified as a Class 2 power supply. These limits must be met even under single component fault conditions. The power limit on a UL1310 Class 2 power supply, for example, is currently 100 Watts per output channel. Thus, while a single channel power supply may be limited to driving electronic devices at 100 Watts per output channel, a multichannel power supply may combine multiple 100 Watt channels to drive much higher power devices without exceeding the limits enforced by the standard. Thus, typical multichannel power supplies often employ a shunt resistor and differential amplifier on each channel to control output, wherein the feedback and control loop tolerances are kept as low as possible by using low tolerance components.

SUMMARY

Despite the potential benefits, utilization of multichannel power supplies is currently limited. Conventional multichannel power supplies, such as described above, suffer from a variety of deficiencies. Using low tolerance components substantially increases the cost of the multichannel power supply and may create more vulnerability to deviation when operating in extreme environments. The ability to configure conventional multichannel power supplies is limited, because typically, any calibration is applied across all of the channels. In conventional multichannel power supplies that support individual channel calibration often employ separate digital to analog converters (DAC) or pulse width modulation (PWM) sources on each channel, which may also elevate the cost and complexity of the device.

Embodiments of the present invention overcome such deficiencies by providing systems and methods related to a multichannel power supply that outputs a constant current. A controller provides an input to a reference voltage circuit, prior to the controller causing a multiplexer to select one of a plurality of source circuits. Each source circuit corresponds to an output channel of the multichannel power supply, and thus each output channel provides a constant current output. The controller then causes the multiplexer to select the source circuit. The reference voltage circuit provides a reference voltage to the selected source circuit based on the input, and the source circuit provides a constant current output based on being selected by the multiplexer and the reference voltage provided by the reference voltage circuit.

In an embodiment, there is provided a system. The system includes: a front end circuit configured to receive an input voltage and to provide a regulated front end direct current (DC) voltage; a multichannel source circuit coupled to the front-end circuit, the multichannel source circuit comprising a controller, a reference voltage circuit, and a plurality of source circuits, wherein each source circuit in the plurality of source circuits represents a distinct output channel, and wherein the multichannel source circuit is configured to generate a constant current output for each source circuit in the plurality of source circuits; and a plurality of loads, wherein each load in the plurality of loads is connected to a corresponding source circuit in the plurality of source circuits and is configured to receive the corresponding constant current output via the corresponding source circuit.

In a related embodiment, the controller may be configured to generate an input to the reference voltage circuit, the reference voltage circuit may be configured to generate a reference voltage and to provide the reference voltage to the plurality of source circuits, and the reference voltage may be based upon the generated input. In a further related embodiment, the input may be a pulse width modulation signal, wherein the reference voltage circuit may include a first resistor and a first transistor coupled to a low side of the front end DC voltage, and a second resistor and second transistor coupled to a high side of the front end DC voltage, and wherein the reference voltage may be a modified pulse width modulation signal based on the pulse width modulation signal. In another further related embodiment, the input may be a digital voltage, wherein the reference voltage circuit may include a digital-to-analog converter coupled to the front end DC voltage, and wherein the reference voltage may be an analog voltage based on the digital voltage.

In yet another further related embodiment, the controller may include a multiplexer, wherein the multiplexer may include a plurality of outputs, each of which may be coupled to a corresponding source circuit in the plurality of source circuits, wherein the controller may be configured to cause the multiplexer to select each source circuit in the plurality of source circuits in a sequence, and wherein upon selection of each source circuit, the multiplexer may be configured to provide a predetermined voltage to the selected source circuit. In a further related embodiment, the input to the reference voltage circuit may be predetermined based on the source circuit selected by the multiplexer.

In still yet another further related embodiment, each source circuit in the plurality of source circuits may include: a first resistor and a first transistor coupled to the multiplexer to receive the predetermined voltage; a second resistor coupled to a high side of the front end DC voltage; and a second transistor coupled to the reference voltage and a capacitor; wherein the first transistor may be configured to, upon receiving the predetermined voltage from the multiplexer, cause the second transistor to charge the capacitor based on the reference voltage.

In a further related embodiment, the capacitor may be coupled to an amplifier, and the amplifier may be configured to output a voltage based on a voltage of the capacitor.

In another further related embodiment, the system may further include a third resistor coupled across a source and a drain of the second transistor, the third resister configured to receive a discharge current from the capacitor.

In still another further related embodiment, the system may further include a diode coupled between the second transistor and the capacitor and a fourth resistor coupled between the capacitor and a low side of the front end DC voltage, the fourth resistor configured to receive a discharge current from the capacitor.

In another embodiment, there is provided a system. The system includes: a front end circuit configured to receive an input voltage and to provide a regulated front end direct current (DC) voltage; and a multichannel source circuit coupled to the front-end circuit, the multichannel source circuit configured to generate a constant current output for each of a plurality of output channels, the multichannel source circuit comprising a plurality of source circuits corresponding to the plurality of output channels; wherein the multichannel source circuitry further comprises a reference voltage circuit coupled to the plurality of source circuits, the reference voltage circuit configured to provide a reference voltage to the plurality of source circuits; and wherein the multichannel source circuit further comprises a controller coupled to the plurality of source circuits and the reference voltage circuit, the controller comprising a multiplexer and configured to cause the multiplexer to select each source circuit in the plurality of source circuits in sequence, and upon selection, to generate a predetermined voltage and to provide the predetermined voltage to the selected source circuit, and to provide an input to the reference voltage circuit based on the selected source circuit.

In a related embodiment, the input may be a pulse width modulation signal, the reference voltage circuit may include a first resistor and a first transistor coupled to a low side of the front end DC voltage, and a second resistor and a second transistor coupled to a high side of the front end DC voltage, and the reference voltage circuit may be configured to generate a modified pulse width modulation signal based on the pulse width modulation signal.

In another related embodiment, the input may be a digital voltage, the reference voltage circuit may include a digital-to-analog converter coupled to the front end DC voltage, and the reference voltage circuit may be configured to output an analog voltage based on the digital voltage.

In yet another related embodiment, each source circuit in the plurality of source circuits may include: a first resistor and a first transistor coupled to the multiplexer; a second resistor coupled to a high side of the front end DC voltage; and a second transistor coupled to the reference voltage circuit and a capacitor; wherein the first transistor may be configured to, upon receiving the predetermined voltage from the multiplexer, cause the second transistor to charge the capacitor based on the reference voltage. In a further related embodiment, the capacitor may be coupled to an amplifier configured to output a voltage based on a voltage of the capacitor. In another further related embodiment, the system may further include a third resistor coupled across a source and a drain of the second transistor, the third resister configured to receive a discharge current from the capacitor.

In yet still another related embodiment, the system may further include a diode coupled between the second transistor and the capacitor and a fourth resistor coupled between the capacitor and a low side of the front end DC voltage, the fourth resistor configured to receive a discharge current from the capacitor.

In another embodiment, there is provided a method of generating a plurality of channels of output power. The method includes: determining a selection sequence for a plurality of source circuits, wherein the selection sequence indicates an order in which each source circuit in the plurality of source circuits will be selected; configuring an input based on a next source circuit to be selected according to the selection sequence; providing the input to a reference voltage circuit; generating a reference voltage based on the provided input; selecting the next source circuit according to the selection sequence; sending the generated reference voltage to the selected source circuit; generating an output current for a channel in the plurality of channels, wherein the channel corresponds to the selected source circuit; and repeating configuring, providing, generating, selecting, sending, and generating until every source circuit in the selection sequence has been selected, so as to generate multiple output currents for the plurality of channels.

In a related embodiment, the method may further include: prior to repeating, unselecting the selected source circuit. In another related embodiment, generating an output current may include: charging a capacitor in the selected source circuit based on the sent reference voltage; and generating an output current for a channel in the plurality of channels, wherein the channel corresponds to the selected source circuit, from the charged capacitor.

BRIEF DESCRIPTION OF THE DRAWINGS

The foregoing and other objects, features and advantages disclosed herein will be apparent from the following description of particular embodiments disclosed herein, as illustrated in the accompanying drawings in which like reference characters refer to the same parts throughout the different views. The drawings are not necessarily to scale, emphasis instead being placed upon illustrating the principles disclosed herein.

DETAILED DESCRIPTION

Embodiments provide a multiple channel (or multichannel) power supply that outputs a constant current, where each output channel may be separately calibrated. Such a power supply, which may also be referred to throughout as a multichannel (or multiple channel) power system, includes a front end circuit coupled to a multichannel source circuit. The front end circuit is configured to convert alternating current (AC) or direct current (DC) input voltage into various DC voltages for use throughout the system. The multichannel source circuit includes a controller, a reference voltage circuit, and a plurality of source circuits, each one corresponding to a respective output channel. The controller may include a multiplexer with outputs coupled to each of the source circuits. The controller is configured to provide an input to the reference voltage circuit. The input is configured depending upon the source circuit to be selected by the multiplexer. The controller then causes the multiplexer to select the source circuit, and the reference voltage circuit is configured to provide a reference voltage to the selected source circuit based on the input. The reference voltage may charge a capacitor in the selected source circuit in order to provide a constant current output from the source circuit. The controller may then execute the same reference voltage setting/source circuit selection operations for each of the source circuits in the multichannel source circuitry.

Multichannel power supplies according to embodiments described herein may operate as open-loop or closed-loop systems. For example, in an open-loop configuration, the controller may provide a predetermined input to the reference voltage circuit based on a constant current output desired for each channel. Thus, no feedback is provided to the controller. A closed-loop configuration control may be employed, for example, to balance channel output when combining all of the channels to drive a single load instead of each channel driving a respective load. All of the channel outputs may be routed through a single current measurement circuit, and current measurement may be synchronized with the sequential selection of each source circuit by the multiplexer to help determine the current output from each source circuit. The measurement may then be fed back to the controller for balancing the current output from all of the channels.

Figure 1:
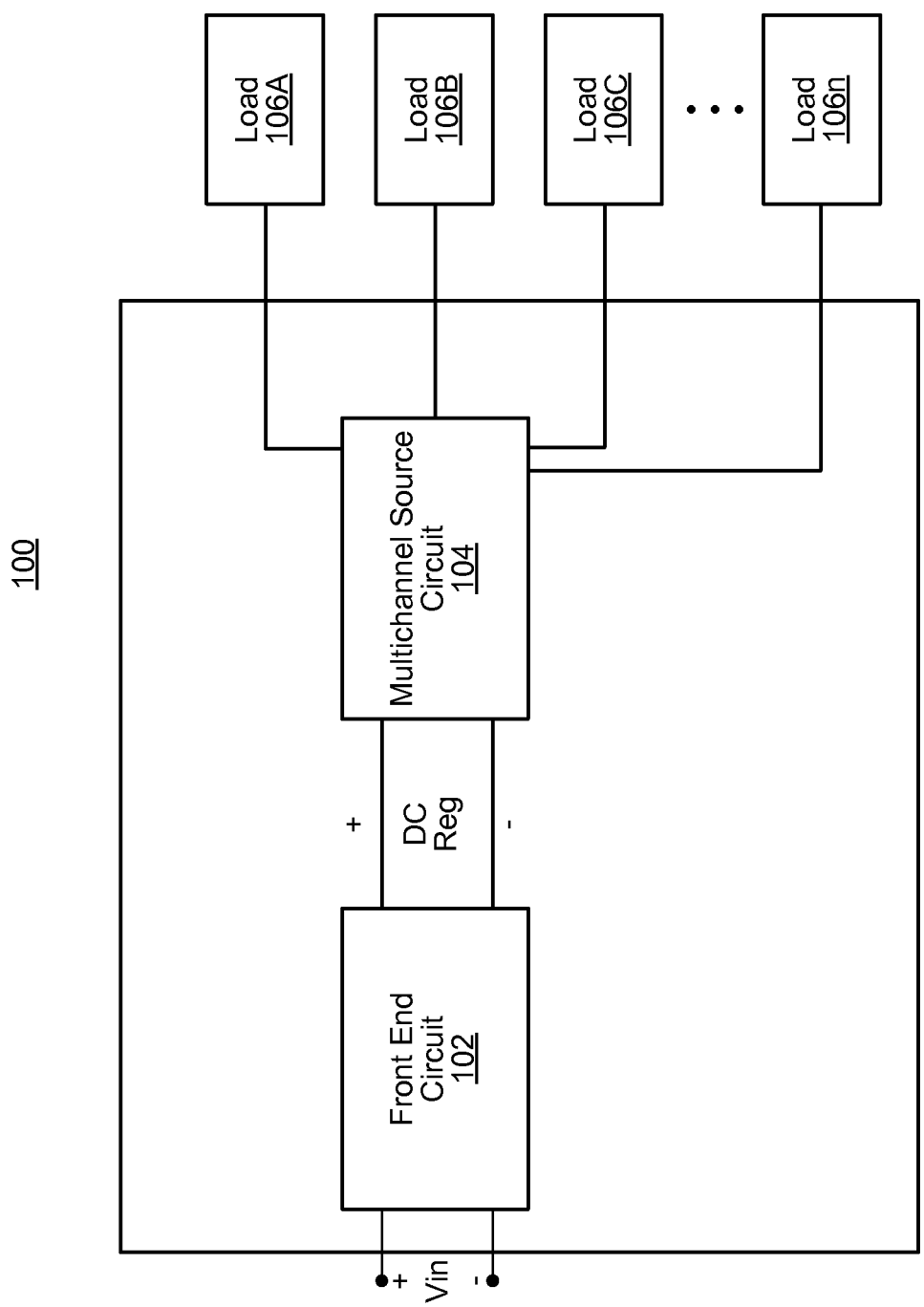
FIG. 1 shows a block diagram of an open loop multi-channel power supply according to embodiments disclosed herein.

FIG. 1 illustrates a block diagram of a multichannel power supply 100 that outputs a constant current. The multichannel power supply 100 includes a front end circuit 102 and a multichannel source circuit 104. The multichannel source circuit 104 includes a plurality of output channels, each of which is coupled to one of a plurality of loads 106A, 106B, 106C, . . . 106n. The front end circuit 102 may, and in some embodiments does, include known circuit configurations for receiving an input voltage ($V_{in}$), either directly or through a dimmer circuit (not shown), and providing a regulated direct current (DC) output DCreg to the multichannel source circuit 104. In some embodiments, for example, $V_{in}$ is an alternating current (AC) input provided directly from a 120 VAC/60 Hz line source. It is to be understood, however, that embodiments of a multichannel power supply 100 may operate from other AC sources, such as but not limited to a 220-240 VAC at 50-60 Hz, a DC source, etc. In at least one configuration, the front end circuit 102 includes a rectifier circuit for receiving the input voltage $V_{in}$, a switching converter circuit, and a controller for controlling a switch in the switching converter circuit. Various rectifier circuit configurations are well-known in the art. For example, the rectifier circuit may include a diode bridge rectifier, H-bridge rectifier, etc. The switching converter circuit may receive the rectified AC output from the rectifier and provide the stable, regulated DC output ($DC_{Reg}$) to the multichannel source circuit 104. The plurality of loads 106A, 106B, 106C, . . . 106n comprise an electrical or electronic device to be driven by the multichannel source circuit 104. In some embodiments, the plurality of loads 106A, 106B, 106C, . . . 106n include lighting devices including one or more solid state light sources, such as but not limited to one or more light emitting diodes (LEDs), organic light emitting diodes (OLEDs), polymer light emitting diodes (PLEDs), and combinations thereof, configured in any known way.

Figure 2:
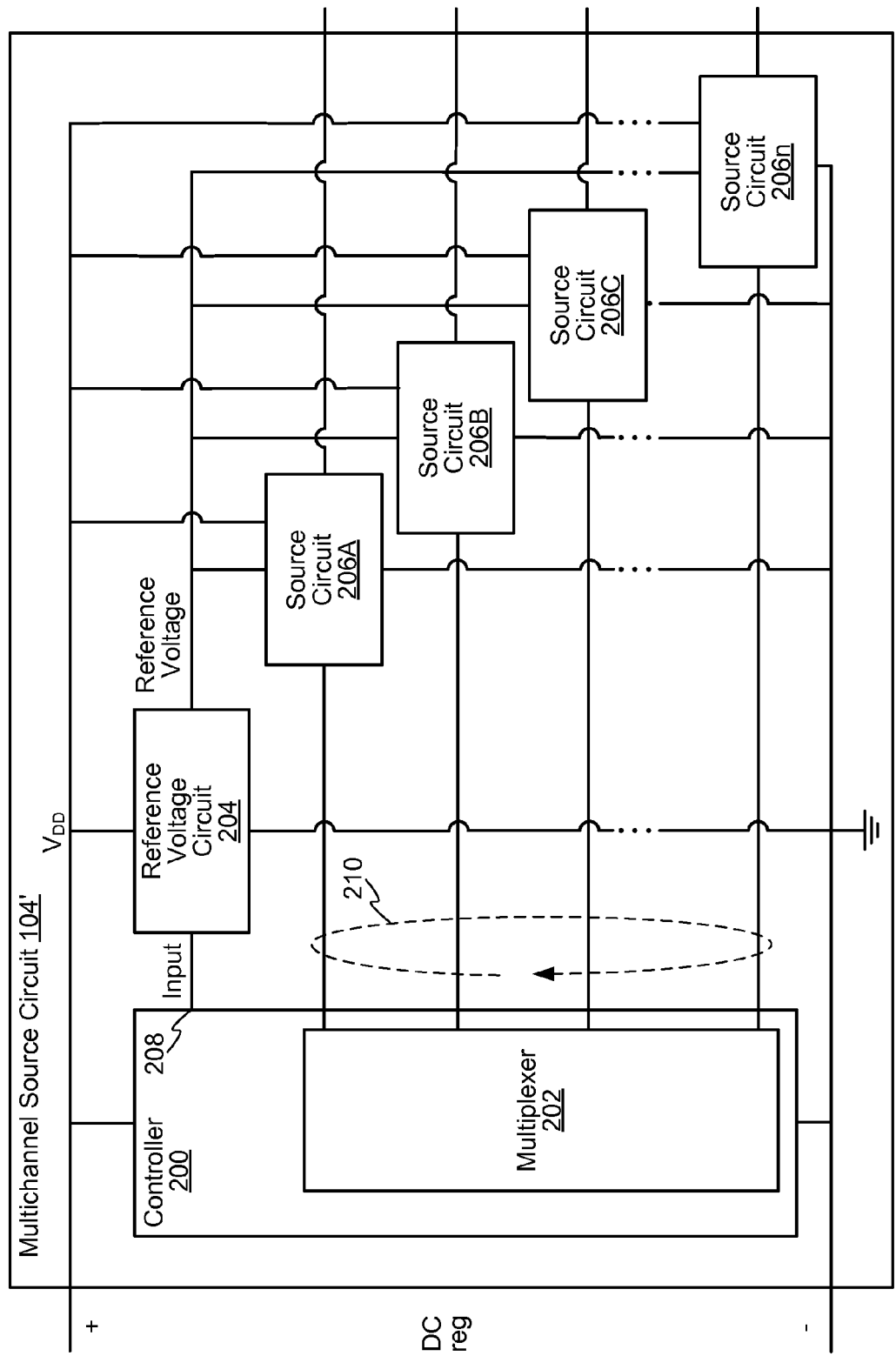
FIG. 2 illustrates a circuit diagram of a multichannel source circuit according to embodiments disclosed herein.

FIG. 2 illustrates a circuit diagram of a multichannel source circuit 104'. The multichannel source circuit 104' includes a controller 200, a reference voltage circuit 204, and a plurality of source circuits 206A, 206B, 206C, . . . 206n. The controller 200 may be, and in some embodiments is, a microcontroller integrated circuit (IC) such as, for example but not limited to, an AT90PWM3B microcontroller manufactured by Atmel Corporation. The controller 200 is powered by a DC voltage, such as but not limited to the regulated direct current (DC) output DCreg from the front end circuit 102 of FIG. 1. The controller 200 is coupled to the reference voltage circuit 204 and, in some embodiments, includes a multiplexer 202. In some embodiments, the multiplexer 202 may be situated in a separate IC coupled to the controller 200. The controller 200 is coupled to the plurality of source circuits 206A, 206B, 206C, . . . 206n, either directly or (as shown in FIG. 2) via the multiplexer 202. The controller 200 is also configured to provide various one or more inputs 208 to the reference voltage circuit 204. The controller 200 is also configured to cause the multiplexer 202 to select each one of the plurality of source circuits 206A, 206B, 206C, . . . 206n, that is, to provide a voltage to each source circuit in the plurality of source circuits 206A, 206B, 206C, . . . 206n that turns the source circuit on, as is described in greater detail below with regards to FIGS. 4 and 5. In other words, as shown via an indicator 210 in FIG. 2, the controller 200, in some embodiments via the multiplexer 202, provides a voltage to each source circuit in the plurality of source circuits 206A, 206B, 206C, . . . 206n. In some embodiments, the controller 200 thus selects each source circuit in the plurality of source circuits 206A, 206B, 206C, . . . 206n in some particular sequence.

In some embodiments, the controller 200 is configured to provide an input 208, which in some embodiments is predetermined, to the reference voltage circuit 204 prior to causing the multiplexer 202 to select a source circuit 206A (also referred to herein as a "next source circuit") in the plurality of source circuits 206A, 206B, 206C, . . . 206n, for a certain time period (e.g., a selection cycle time). If another source circuit in the plurality of source circuits 206A, 206B, 206C, . . . 206n had previously been selected, the controller 200 may cause the multiplexer 202 to first unselect the previously selected source circuit. The controller 200, in some embodiments through the multiplexer 202, then actually selects the next source circuit 206A for the certain time period. For some amount of time during the certain time period, and in some embodiments for the entire time period and/or substantially the entire time period, the reference voltage circuit 204 provides a particular reference voltage based on the input 208 (as described in more detail throughout) to the selected source circuit 206A. The controller then provides another input 208 to the reference voltage circuit 204, which may be and in some embodiments is a predetermined input corresponding to another source circuit 206B in the plurality of source circuits 206A, 206B, 206C, . . . 206n. The another source circuit 206B may be, and in some embodiments is, the next source circuit to be selected according to the selection sequence. The controller 200, in some embodiments through the multiplexer 202, then unselects the previous source circuit 206A and selects the next source circuit 206B. This process continues as the controller 200 (in some embodiments through the multiplexer 202) cycles through selecting each of source circuits in the plurality of source circuits 206A, 206B, 206C, 206n, in some embodiments according to the particular selection sequence.

The reference voltage circuit 204 may be, and in some embodiments is, coupled to a voltage $V_{DD}$, which is based on the regulated DC output DCreg from the front end circuit 102 of FIG. 1, and a ground potential, as shown in FIG. 2.

The reference voltage circuit 204 is also configured to receive the input 208 from the controller 200 and to output a reference voltage to the plurality of source circuits 206A, 206B, 206C, . . . 206n based on the received input 208. The plurality of source circuits 206A, 206B, 206C, . . . 206n may, and in some embodiments are, also coupled to the voltage $V_{DD}$ and the ground potential. The plurality of source circuits 206A, 206B, 206C, . . . 206n are configured to receive a selection input from the controller 200 (i.e., a voltage that causes the source circuit to be selected, that is, to turn on) and a reference voltage from the reference voltage circuit 204, and to output a constant current output based on the received reference voltage.

Figure 3:
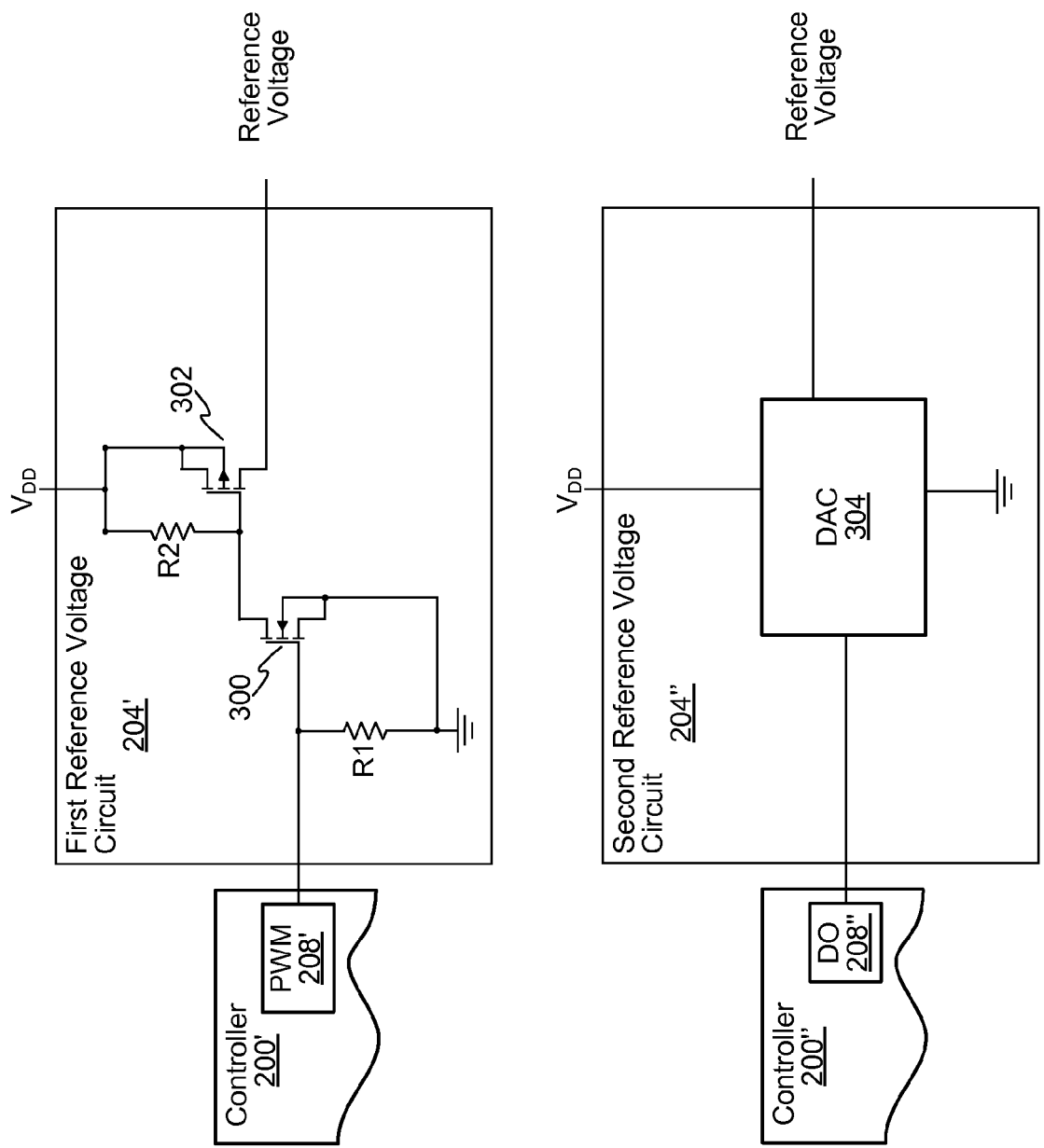
FIG. 3 illustrates circuit diagrams of reference voltage circuits according to embodiments disclosed herein.

FIG. 3 illustrates circuit diagrams of a first reference voltage circuit 204' and a second reference voltage circuit 204" according to embodiments disclosed herein. In some embodiments, a controller 200' provides a PWM signal 208' as an input to the first reference voltage circuit 204'. The first reference voltage circuit 204' includes a first resistor R1, a second resistor R2, a first transistor 300 (for example but not limited to an n-channel enhancement MOSFET), and a second transistor 302 (for example but not limited to a p-channel enhancement MOSFET). The PWM signal 208' is fed into the junction of the first resistor R1 and a gate of the first transistor 300, with a source of the first transistor 300 and the first resistor R1 coupled to a ground potential. A drain of the first transistor 300 is coupled to the junction of the second resistor R2 and a gate of the second transistor 302. A source of the second transistor 302 and the second resistor R2 are coupled to the voltage $V_{DD}$, which is, for example but not limited to, the regulated DC output DCreg of the front end circuit 102 of FIG. 1. A reference voltage is output from a drain of the second transistor 302. In operation, the PWM signal 208' continuously transitions from a high stage to a low stage. At the high stage of the PWM signal 208', the first transistor 300 conducts from its drain to its source, causing the gate of the second transistor 302 to be coupled to the ground potential. The gate of the second transistor 302 going low, because it is connected to the ground potential, causes the second transistor 302 to couple its source to its drain, and therefore, the reference voltage output by the first reference voltage circuitry 204' is the voltage $V_{DD}$. Conversely, when the PWM signal 208' is at the low stage, the first transistor 300 and the second transistor 302 do not conduct. The resulting reference voltage output from the first reference voltage circuit 204' is then based on the PWM signal 208', with an amplitude based on the voltage $V_{DD}$. In other words, the resulting reference voltage is a modified PWM signal. In some embodiments, the PWM signal 208' may be a 100 KHz PWM signal while the controller 200 switches based on a slower 4 KHz cycle. The substantially faster duty cycle of the PWM signal 208' may be adjusted each time the first reference voltage circuit 204' is connected to another channel (e.g., one of the plurality of source circuits 206A, 206B, 206C, . . . 206n shown in FIG. 2), thereby creating a reference voltage (e.g., a modified PWM signal output from the first reference voltage circuit 204') corresponding to the channel (i.e., source circuit) that is going to be selected next by the controller 200.

The second reference voltage circuit 204" receives as input from the controller 200 a digital signal output (DO) 208". The second reference voltage circuit 204" includes a digital-to-analog converter (DAC) 304. While the DAC 304 is illustrated in FIG. 3 as a separate component that receives the DO 208" from the controller 200", it is also possible for the DAC 304 to be incorporated within the controller 200" itself (e.g., a AT90PWM3B microcontroller manufactured by the Atmel Corporation includes DAC functionality). During operation, the controller 200" outputs a digital value as the DO 208" (e.g., a predetermined value corresponding to the particular source circuit in the plurality of source circuits 206A, 206B, 206C, . . . 206n that will be selected next by the controller 200"). The DAC 304 converts the DO 208" to an analog voltage that is output from the second reference voltage circuit 204". The analog voltage output from the second reference voltage circuit 204" is then provided to the source circuit in the plurality of source circuits 206A, 206B, 206C, . . . 206n that is to be selected next by the controller 200".

Figure 4:
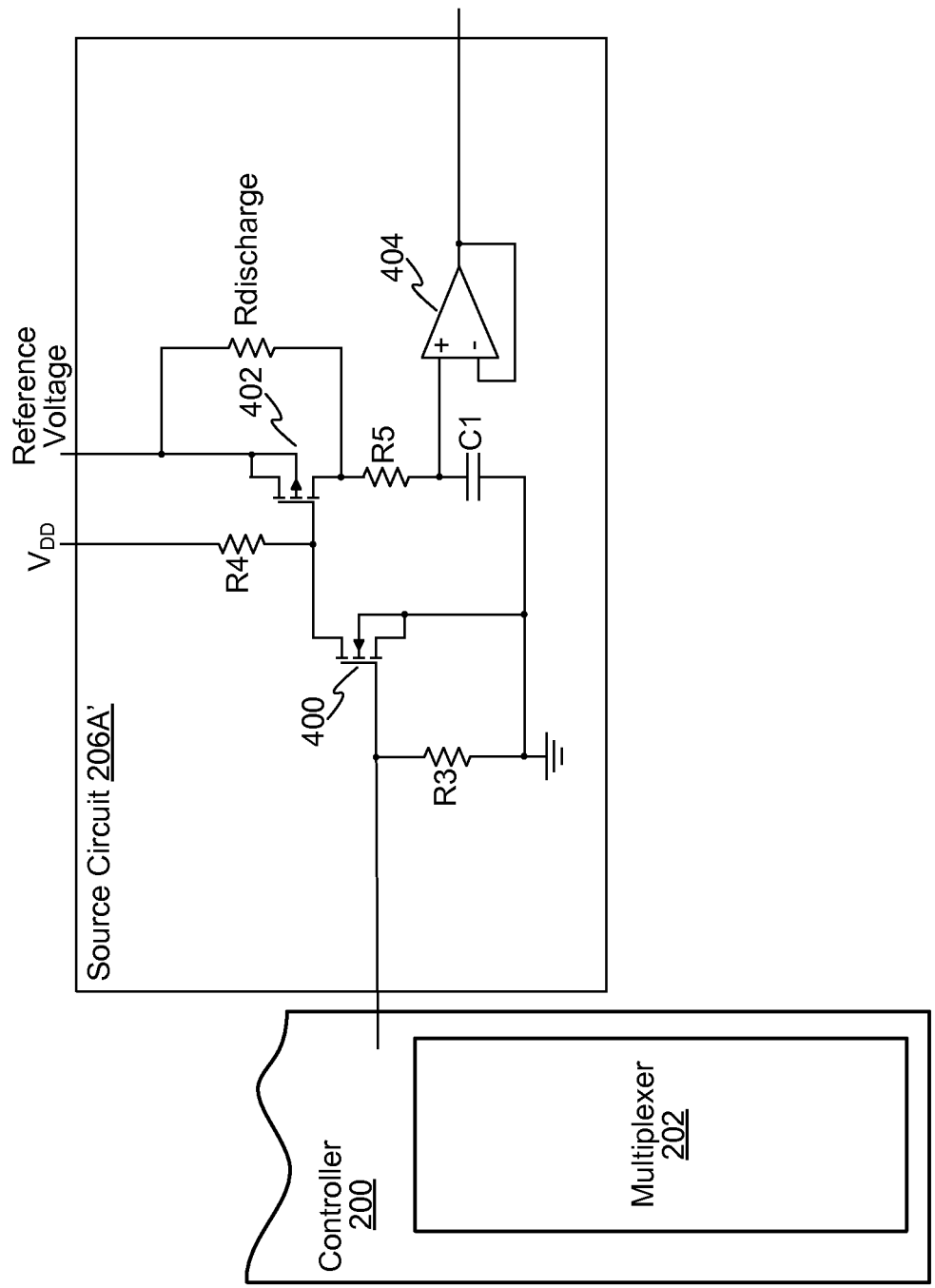
FIG. 4 illustrates a circuit diagram of a source circuit according to embodiments disclosed herein.

FIG. 4 illustrates a circuit diagram of a source circuit 206A' in a plurality of source circuits 206A', 206B', 206C', . . . 206n'. The remaining source circuits in the plurality of source circuits 206A', 206B', 206C', . . . 206n' may be, and in some embodiments are, configured in the same way as the source circuit 206A' shown in FIG. 4. The source circuit 206A' includes a third resistor R3, a fourth resistor R4, a fifth resistor R5, a discharge resistor Rdischarge, a third transistor 400 (for example but not limited to an n-channel enhancement MOSFET), a fourth transistor 402 (for example but not limited to a p-channel enhancement MOSFET), a capacitor C1, and an amplifier 404. The third resistor R3 is coupled to a gate of the third transistor 400, and the drain of the third transistor 400 is coupled to a gate of the fourth transistor 402. The third resistor R3 and a source of the third transistor 400 are coupled to ground. The fourth resistor R4 is coupled to a voltage $V_{DD}$ (which may be, and in some embodiments is, the regulated DC output DCreg of the front end circuit 102 of FIG. 1) and the gate of the fourth transistor 402. A source of the fourth transistor 402 is coupled to the output of the reference voltage circuit 204 shown in FIG. 2, in order to receive its output reference voltage, and a drain of the fourth transistor 402 is coupled to the fifth resistor R5. The fifth resistor R5 is also coupled to the capacitor C1 and the amplifier 404. The capacitor C1 is also coupled to ground, and an output of the amplifier 404 is the output of the source circuit 206A'. The discharge resistor Rdischarge is arranged across the source and the drain of the fourth transistor 402, and is configured to provide a discharge path for current generated from the capacitor C1 as it discharges.

During operation, the controller 200 causes the multiplexer 202 to select the source circuit 206A', wherein selection comprises providing a predetermined voltage to the gate of the third transistor 400. The predetermined voltage causes the third transistor 400 to conduct (i.e., causes the third transistor 400 to turn on), which couples the gate of the fourth transistor 402 to ground. The gate of the fourth transistor 402 going low causes it to conduct (i.e., turn on), providing current through the fifth resistor R5 to charge the capacitor C1 based on the reference voltage received from the reference voltage circuit 204 (not shown in FIG. 4). The voltage of the capacitor C1 is provided as the output of the source circuit 206A' through the amplifier 404, which may be configured as a unity gain buffer amplifier as shown in FIG. 4. In this configuration, the amplifier 404 outputs the same voltage provided to it by the capacitor C1 without drawing any current from the selected source circuit 206A'. The controller 200 then causes the multiplexer 202 to unselect the selected source circuit 206A', which results in the capacitor C1 no longer charging because it is no longer receiving the reference voltage. As soon as the capacitor C1 ceases charging, the capacitor C1 will start to discharge, which results in a current flowing back through the fourth resistor R4 and the discharge resistor Rdischarge.

Figure 5:
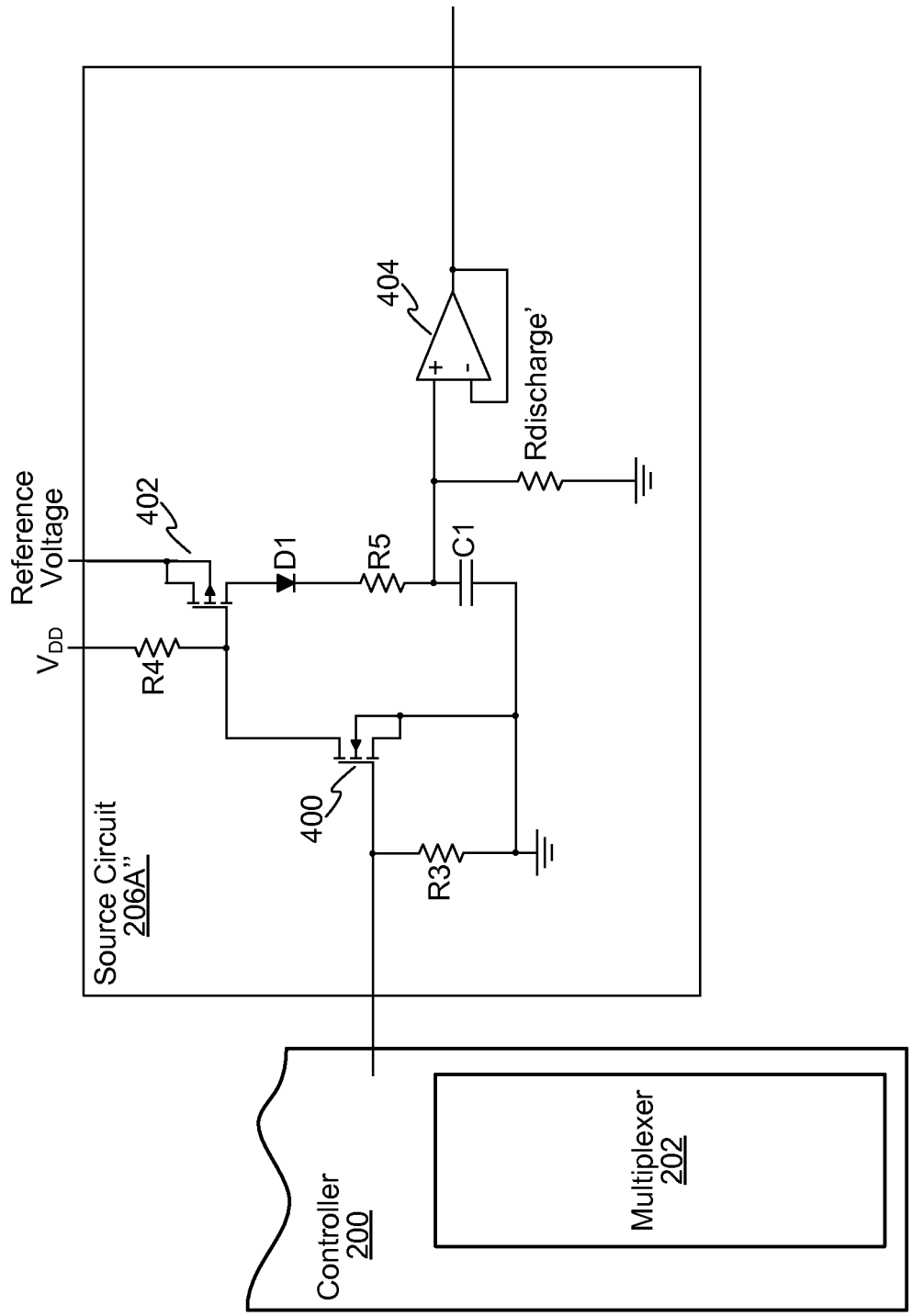
FIG. 5 illustrates a circuit diagram of a source circuit according to embodiments disclosed herein.

FIG. 5 illustrates a circuit diagram of another embodiment of a source circuit 206A" in a plurality of source circuits 206A", 206B", 206C", . . . 206n". In such embodiments, it may be advantageous to prevent the capacitor C1 of the source circuit 206A' shown in FIG. 4 from discharging through its voltage source, i.e., the reference voltage circuit 204, in order to provide a stable dimming voltage level. To prevent this effect, in FIG. 5 the source circuit 206A" is configured in the same way as the source circuit 206A' from FIG. 4, with the addition of a diode D1 between the drain of the fourth transistor 402 and the capacitor C1. Further, a dimming discharge resistor Rdischarge' is not located between the source and the drain of the fourth transistor 402, but rather is coupled between the capacitor C1 and the amplifier 404 and ground. In this configuration, the discharge current of the capacitor C1 is blocked from discharging through the reference voltage circuit 204 by the diode D1, causing the discharge current to be rerouted where it harmlessly passes out to ground through the third resistor R3. Of course, as with the source circuit 206A' in FIG. 4, any of the other source circuits in the plurality of source circuits 206A", 206B", 206C", . . . 206n" may be configured in the same as the source circuit 206A" shown in FIG. 5.

Figure 6:
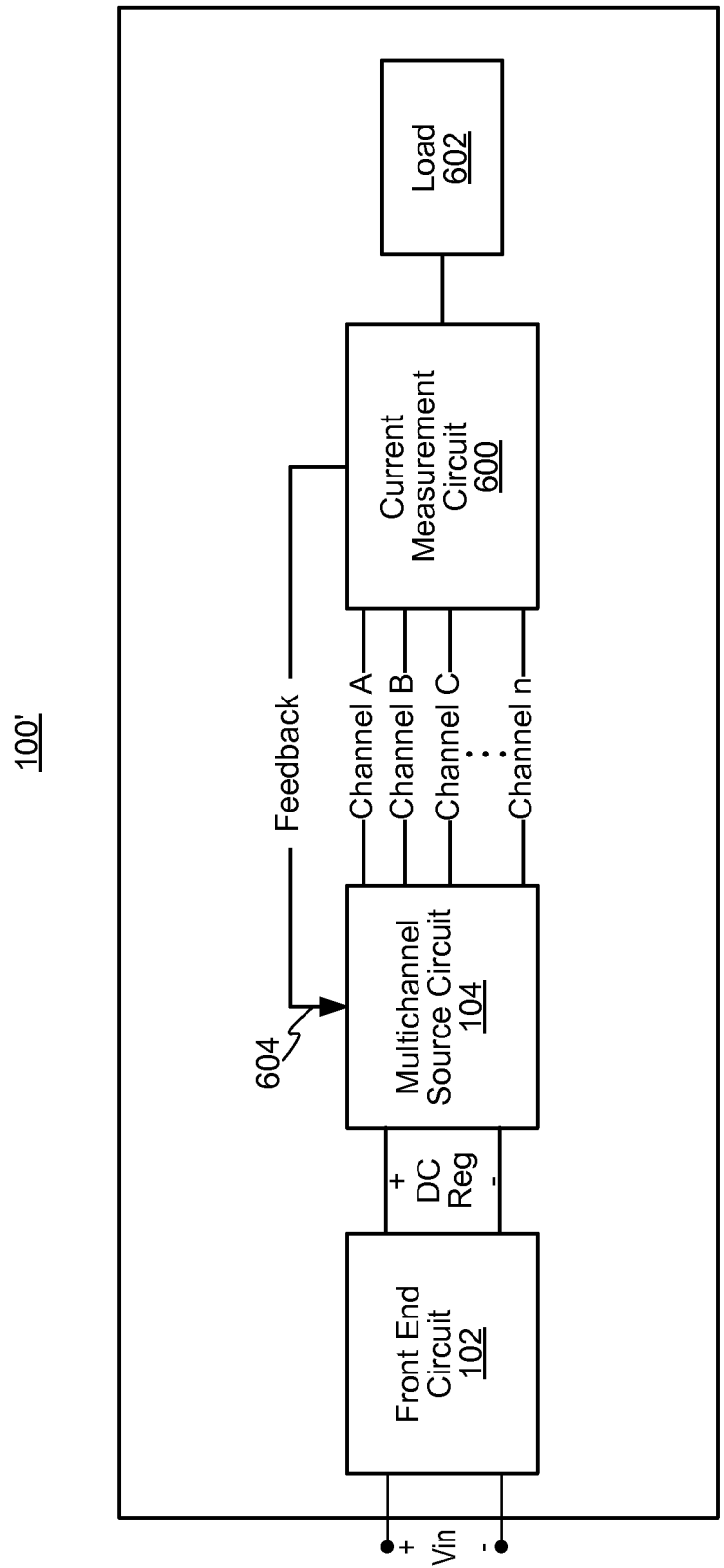
FIG. 6 illustrates a block diagram of a closed loop multichannel power supply according to embodiments disclosed herein.

FIG. 6 illustrates a block diagram of a closed loop multichannel power system 100'. In some applications for such a system, each output channel may not be supplying a separate load, but rather is combined in order to create more capacity for powering one or more larger devices. In such applications, the closed loop multichannel power system 100' may be employed such that a system current (e.g., the sum of the current provided by all, or in some embodiments, more than one, channel(s)) may be measured in order to provide feedback 604 to control performance of the closed loop multichannel power system 100'. Similar to FIG. 1, the front end circuit 102 is coupled to the multichannel source circuit 104, however unlike FIG. 1, here all of a plurality of output channels A, B, C, . . . n (which are the outputs of the plurality of source circuits 206A, 206B, 206C, . . . 206n shown in FIG. 2) are combined and routed through a current measurement circuit 600 prior to being supplied to a load 602. In some embodiments, the current measurement circuit 600 includes a single resistor shunt through which the current from the combined plurality of output channels A, B, C, . . . n pass and is measured. The current provided by each channel in the plurality of output channels A, B, C, . . . n may be, and in some embodiments is, determined by delaying channel selection for a measurement period, and then sequencing through each channel while measuring the combined current during each measurement period. The current being contributed from each channel in the plurality of output channels A, B, C, . . . n may be, and in some embodiments is, determined based on the monitored change in the combined current during each measurement period. In some embodiments, the current being contributed from each channel in the plurality of output channels A, B, C, . . . n is utilized as a feedback signal 604 to the multichannel source circuit 104 (in some embodiments, to the controller 200 of the multichannel source circuit 104) to balance the current being output by the plurality of output channels A, B, C, . . . n. In this manner, channel-to-channel deviation in current may be minimized without the need for a calibration/reference source. The example channel-to-channel-balancer disclosed in FIG. 6 may accommodate deviation not only due to component tolerances, but also due to temperature, line/load regulation, and/or other effects, and combinations thereof.

Figure 7:
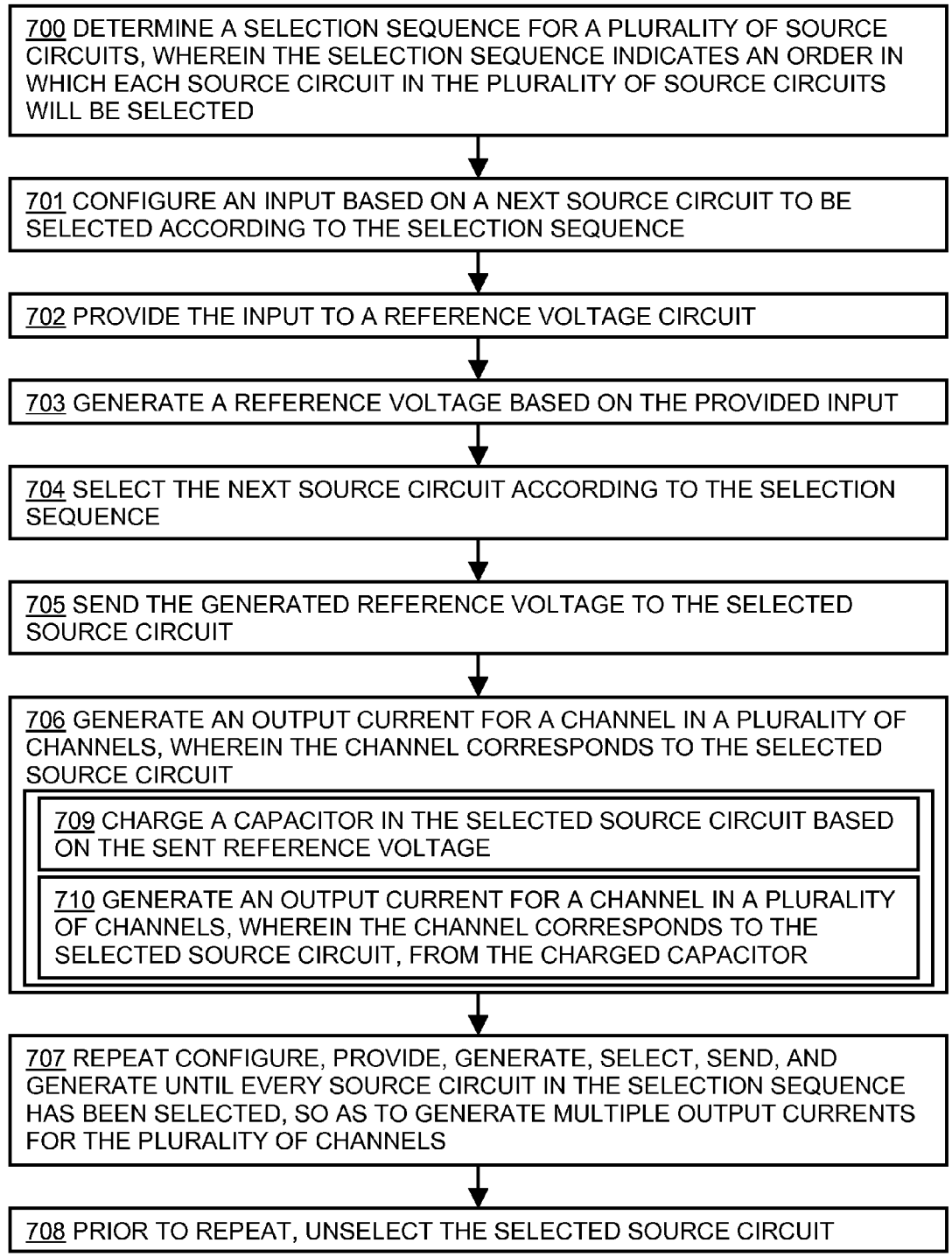
FIG. 7 illustrates a flowchart of operations to generate output in a multichannel power supply according to embodiments disclosed herein.

FIG. 7 illustrates a flowchart of operations to generate output in a multichannel power supply, such as but not limited to the multichannel power supply shown in FIGS. 1 and 6, according to embodiments disclosed herein. The illustrated flowchart is shown and described as including a particular sequence of steps. It is to be understood, however, that the sequence of steps merely provides an example of how the general functionality described herein can be implemented. The steps do not have to be executed in the order presented unless otherwise indicated.

A selection sequence for a plurality of source circuits, such as but not limited to the plurality of source circuits 206A, 206B, 206C, . . . 206n shown in FIG. 2, is determined, step 700. The selection sequence indicates an order in which each source circuit in the plurality of source circuits will be selected by a controller, such as but not limited to the controller 200 of FIG. 2. An input is configured based on a next source circuit in the plurality of source circuits to be selected according to the selection sequence, step 701. In some embodiments, the controller configures the input. The input is then provided to a reference voltage circuit, such as but not limited to the reference voltage circuit 204 in FIG. 2, step 702. A reference voltage is then generated based on the provided input, step 703. The next source circuit in the plurality of source circuits to be selected according to the selection sequence is then selected, step 704. In some embodiments, the controller selects the next source circuit. In some embodiments, a multiplexer of the controller, such as but not limited to the multiplexer 202 of FIG. 2, selects the next source circuit. The generated reference voltage is then sent to the selected next source circuit, step 705. The selected next source circuit then generates an output current for a channel of a multichannel power supply, such as but not limited to the multichannel power supply 100 of FIG. 1, step 706. The steps 702-706 are then repeated for each successive next source circuit in the plurality of source circuits until every source circuit in the selection sequence has been selected, step 707.

In some embodiments, prior to each repeating of the steps 702-706, the selected source circuit is unselected, step 708. In some embodiments, the unselection is performed by the controller. In some embodiments, the unselection is performed by the multiplexer. In some embodiments, to generate an output current, a capacitor in the selected source circuit is charged based on the sent reference voltage, step 709, and the output current is generated from the charged capacitor, step 710.

While FIG. 7 illustrates various steps, it is to be understood that not all of the operations depicted in FIG. 7 are necessary for other embodiments. Indeed, it is fully contemplated herein that in other embodiments of the present disclosure, the steps depicted in FIG. 7, and/or other operations described herein, may be combined in a manner not specifically shown in any of the drawings, but still fully consistent with the present disclosure. Thus, claims directed to features and/or operations that are not exactly shown in one drawing are deemed within the scope and content of the present disclosure.

The methods and systems described herein are not limited to a particular hardware or software configuration, and may find applicability in many computing or processing environments. The methods and systems may be implemented in hardware or software, or a combination of hardware and software. The methods and systems may be implemented in one or more computer programs, where a computer program may be understood to include one or more processor executable instructions. The computer program(s) may execute on one or more programmable processors, and may be stored on one or more storage medium readable by the processor (including volatile and non-volatile memory and/or storage elements), one or more input devices, and/or one or more output devices. The processor thus may access one or more input devices to obtain input data, and may access one or more output devices to communicate output data. The input and/or output devices may include one or more of the following: Random Access Memory (RAM), Redundant Array of Independent Disks (RAID), floppy drive, CD, DVD, magnetic disk, internal hard drive, external hard drive, memory stick, or other storage device capable of being accessed by a processor as provided herein, where such aforementioned examples are not exhaustive, and are for illustration and not limitation.

The computer program(s) may be implemented using one or more high level procedural or object-oriented programming languages to communicate with a computer system; however, the program(s) may be implemented in assembly or machine language, if desired. The language may be compiled or interpreted.

As provided herein, the processor(s) may thus be embedded in one or more devices that may be operated independently or together in a networked environment, where the network may include, for example, a Local Area Network (LAN), wide area network (WAN), and/or may include an intranet and/or the internet and/or another network. The network(s) may be wired or wireless or a combination thereof and may use one or more communications protocols to facilitate communications between the different processors. The processors may be configured for distributed processing and may utilize, in some embodiments, a client-server model as needed. Accordingly, the methods and systems may utilize multiple processors and/or processor devices, and the processor instructions may be divided amongst such single- or multiple-processor/devices.

The device(s) or computer systems that integrate with the processor(s) may include, for example, a personal computer(s), workstation(s) (e.g., Sun, HP), personal digital assistant(s) (PDA(s)), handheld device(s) such as cellular telephone(s) or smart cellphone(s), laptop(s), handheld computer(s), or another device(s) capable of being integrated with a processor(s) that may operate as provided herein. Accordingly, the devices provided herein are not exhaustive and are provided for illustration and not limitation.

References to "a microprocessor" and "a processor", or "the microprocessor" and "the processor," may be understood to include one or more microprocessors that may communicate in a stand-alone and/or a distributed environment(s), and may thus be configured to communicate via wired or wireless communications with other processors, where such one or more processor may be configured to operate on one or more processor-controlled devices that may be similar or different devices. Use of such "microprocessor" or "processor" terminology may thus also be understood to include a central processing unit, an arithmetic logic unit, an application-specific integrated circuit (IC), and/or a task engine, with such examples provided for illustration and not limitation.

Furthermore, references to memory, unless otherwise specified, may include one or more processor-readable and accessible memory elements and/or components that may be internal to the processor-controlled device, external to the processor-controlled device, and/or may be accessed via a wired or wireless network using a variety of communications protocols, and unless otherwise specified, may be arranged to include a combination of external and internal memory devices, where such memory may be contiguous and/or partitioned based on the application. Accordingly, references to a database may be understood to include one or more memory associations, where such references may include commercially available database products (e.g., SQL, Informix, Oracle) and also proprietary databases, and may also include other structures for associating memory such as links, queues, graphs, trees, with such structures provided for illustration and not limitation.

References to a network, unless provided otherwise, may include one or more intranets and/or the internet. References herein to microprocessor instructions or microprocessor-executable instructions, in accordance with the above, may be understood to include programmable hardware.

As used throughout, a "circuit" or "circuitry" may comprise, for example, singly or in any combination, hardwired circuitry, programmable circuitry, state machine circuitry, and/or firmware that stores instructions executed by programmable circuitry.

Unless otherwise stated, use of the word "substantially" may be construed to include a precise relationship, condition, arrangement, orientation, and/or other characteristic, and deviations thereof as understood by one of ordinary skill in the art, to the extent that such deviations do not materially affect the disclosed methods and systems.

Throughout the entirety of the present disclosure, use of the articles "a" and/or "an" and/or "the" to modify a noun may be understood to be used for convenience and to include one, or more than one, of the modified noun, unless otherwise specifically stated. The terms "comprising", "including" and "having" are intended to be inclusive and mean that there may be additional elements other than the listed elements.

Elements, components, modules, and/or parts thereof that are described and/or otherwise portrayed through the figures to communicate with, be associated with, and/or be based on, something else, may be understood to so communicate, be associated with, and or be based on in a direct and/or indirect manner, unless otherwise stipulated herein. Thus, the term "coupled" as used herein refers to any connection, coupling, communication, link or the like by which signals carried by one system element are imparted to the "coupled" element. Such "coupled" devices, or signals and devices, are not necessarily directly connected to one another and may be separated by intermediate components or devices that may manipulate or modify such signals. Likewise, the terms "connected" or "coupled" as used herein in regard to mechanical or physical connections or couplings is a relative term and does not require a direct physical connection.

Although the methods and systems have been described relative to a specific embodiment thereof, they are not so limited. Obviously many modifications and variations may become apparent in light of the above teachings. Many additional changes in the details, materials, and arrangement of parts, herein described and illustrated, may be made by those skilled in the art.

What is claimed is:

1. A system, comprising:
 a front end circuit configured to receive an input voltage and to provide a regulated front end direct current (DC) voltage;
 a multichannel source circuit coupled to the front-end circuit, the multichannel source circuit comprising a controller, a reference voltage circuit, and a plurality of source circuits, wherein each source circuit in the plurality of source circuits represents a distinct output channel, and wherein the multichannel source circuit is configured to generate a constant current output for each source circuit in the plurality of source circuits; and a plurality of loads, wherein each load in the plurality of loads is connected to a corresponding source circuit in the plurality of source circuits and is configured to receive the corresponding constant current output via the corresponding source circuit, wherein the controller is configured to generate an input to the reference voltage circuit, wherein the reference voltage circuit is configured to generate a reference voltage and to provide the reference voltage to the plurality of source circuits, and wherein the reference voltage is based upon the generated input.

2. The system of claim 1, wherein the input is a pulse width modulation signal, wherein the reference voltage circuit comprises a first resistor and a first transistor coupled to a low side of the front end DC voltage, and a second resistor and second transistor coupled to a high side of the front end DC voltage, and wherein the reference voltage is a modified pulse width modulation signal based on the pulse width modulation signal.

3. The system of claim 1, wherein the input is a digital voltage, wherein the reference voltage circuit includes a digital-to-analog converter coupled to the front end DC voltage, and wherein the reference voltage is an analog voltage based on the digital voltage.

4. The system of claim 1, wherein the controller comprises a multiplexer, wherein the multiplexer comprises a plurality of outputs, each of which is coupled to a corresponding source circuit in the plurality of source circuits, wherein the controller is configured to cause the multiplexer to select each source circuit in the plurality of source circuits in a sequence, and wherein upon selection of each source circuit, the multiplexer is configured to provide a predetermined voltage to the selected source circuit.

5. The system of claim 4, wherein the input to the reference voltage circuit is predetermined based on the source circuit selected by the multiplexer.

6. The system of claim 4, wherein each source circuit in the plurality of source circuits comprises:
a first resistor and a first transistor coupled to the multiplexer to receive the predetermined voltage;
a second resistor coupled to a high side of the front end DC voltage; and
a second transistor coupled to the reference voltage and a capacitor;
wherein the first transistor is configured to, upon receiving the predetermined voltage from the multiplexer, cause the second transistor to charge the capacitor based on the reference voltage.

7. The system of claim 6, wherein the capacitor is coupled to an amplifier, and wherein the amplifier is configured to output a voltage based on a voltage of the capacitor.

8. The system of claim 6, further comprising a third resistor coupled across a source and a drain of the second transistor, the third resister configured to receive a discharge current from the capacitor.

9. The system of claim 6, further comprising a diode coupled between the second transistor and the capacitor and a fourth resistor coupled between the capacitor and a low side of the front end DC voltage, the fourth resistor configured to receive a discharge current from the capacitor.

10. A system, comprising:
a front end circuit configured to receive an input voltage and to provide a regulated front end direct current (DC) voltage; and
a multichannel source circuit coupled to the front-end circuit, the multichannel source circuit configured to generate a constant current output for each of a plurality of output channels, the multichannel source circuit comprising a plurality of source circuits corresponding to the plurality of output channels;
wherein the multichannel source circuitry further comprises a reference voltage circuit coupled to the plurality of source circuits, the reference voltage circuit configured to provide a reference voltage to the plurality of source circuits; and
wherein the multichannel source circuit further comprises a controller coupled to the plurality of source circuits and the reference voltage circuit, the controller comprising a multiplexer and configured to cause the multiplexer to select each source circuit in the plurality of source circuits in sequence, and upon selection, to generate a predetermined voltage and to provide the predetermined voltage to the selected source circuit, and to provide an input to the reference voltage circuit based on the selected source circuit.

11. The system of claim 10, wherein the input is a pulse width modulation signal, wherein the reference voltage circuit comprises a first resistor and a first transistor coupled to a low side of the front end DC voltage, and a second resistor and a second transistor coupled to a high side of the front end DC voltage, and wherein the reference voltage circuit is configured to generate a modified pulse width modulation signal based on the pulse width modulation signal.

12. The system of claim 10, wherein the input is a digital voltage, wherein the reference voltage circuit comprises a digital-to-analog converter coupled to the front end DC voltage, and wherein the reference voltage circuit is configured to output an analog voltage based on the digital voltage.

13. The system of claim 10, wherein each source circuit in the plurality of source circuits comprises:
a first resistor and a first transistor coupled to the multiplexer;
a second resistor coupled to a high side of the front end DC voltage; and
a second transistor coupled to the reference voltage circuit and a capacitor;
wherein the first transistor is configured to, upon receiving the predetermined voltage from the multiplexer, cause the second transistor to charge the capacitor based on the reference voltage.

14. The system of claim 13, wherein the capacitor is coupled to an amplifier configured to output a voltage based on a voltage of the capacitor.

15. The system of claim 13, further comprising a third resistor coupled across a source and a drain of the second transistor, the third resister configured to receive a discharge current from the capacitor.

16. The system of claim 13, further comprising a diode coupled between the second transistor and the capacitor and a fourth resistor coupled between the capacitor and a low side of the front end DC voltage, the fourth resistor configured to receive a discharge current from the capacitor.

* * * * *